United States Patent
McBrearty et al.

(10) Patent No.: US 7,085,816 B1
(45) Date of Patent: Aug. 1, 2006

(54) REDUCING DOWNLOADING TIME FOR WEB DOCUMENTS AT WORLD WIDE WEB RECEIVING DISPLAY STATIONS BY PRESELECTING SPECIFIED WEB DOCUMENTS TO BE DOWNLOADED IN A TEXT-ONLY MODE

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 09/627,223

(22) Filed: Jul. 27, 2000

(51) Int. Cl.
*G06F 15/16* (2006.01)
(52) U.S. Cl. ...................... 709/217; 709/204; 709/219; 715/753; 715/968; 704/3
(58) Field of Classification Search ................ 709/217, 709/218, 204, 219; 715/753, 968; 704/3
See application file for complete search history.

(56) References Cited

U.S. PATENT DOCUMENTS

| | | | | |
|---|---|---|---|---|
| 5,884,033 A | * | 3/1999 | Duvall et al. ............... | 709/206 |
| 5,896,502 A | * | 4/1999 | Shieh et al. ................ | 709/224 |
| 6,023,701 A | * | 2/2000 | Malik et al. ................ | 707/10 |
| 6,098,102 A | * | 8/2000 | Nielsen et al. ............. | 709/229 |
| 6,182,113 B1 | * | 1/2001 | Narayanaswami .......... | 709/203 |
| 6,223,224 B1 | * | 4/2001 | Bodin ........................ | 709/236 |
| 6,480,852 B1 | * | 11/2002 | Himmel et al. ............. | 707/10 |
| 6,487,588 B1 | * | 11/2002 | Phillips et al. ............. | 709/218 |
| 6,560,639 B1 | * | 5/2003 | Dan et al. ................... | 709/218 |

* cited by examiner

*Primary Examiner*—Jeffrey Pwu
(74) *Attorney, Agent, or Firm*—Jerry B. Kraft; Mark S. Walker; Volel Emile (57) ABSTRACT

In order to reduce overall downloading time for Web documents without depriving the user of valuable Web document resources, the user at a receiving Web station is enabled to preselect which received Web documents will be downloaded in a text-only mode. An implementation is provided at the receiving Web station for determining whether a received web document has been preselected for downloading in a text-only mode, and in responsive to this determination, there is an implementation for downloading such received preselected Web documents in a text-only mode. The user is enabled not only to designate specified documents to be downloaded in a text-only mode but the user may also preselect whole World Wide Web domains or specified Web sites within such domains from which received Web documents are to be downloaded in a text-only mode.

24 Claims, 9 Drawing Sheets

REDUCING DOWNLOADING TIME FOR WEB DOCUMENTS AT WORLD WIDE WEB RECEIVING DISPLAY STATIONS BY PRESELECTING SPECIFIED WEB DOCUMENTS TO BE DOWNLOADED IN A TEXT-ONLY MODE

CROSS-REFERENCE TO RELATED COPENDING PATENT APPLICATIONS

The following patent applications, which are assigned to the assignee of the present invention, cover subject matter related to the subject matter of the present invention: application Ser. No. 08/974,411, C. R. Nielsen et al., filed Nov. 19, 1997; and DYNAMICALLY OPTIMIZING THE DOWNLOADING OF WORLDWIDE WEB HYPERTEXT DOCUMENTS AT RECEIVING DISPLAY STATIONS, G. McBrearty et al. filed concurrently with the present application.

TECHNICAL FIELD

The present invention relates to computer managed communication networks such as the World Wide Web (Web) and, particularly, to reducing the overall downloading time of documents transmitted over the Web at interactive computer controlled Web stations.

BACKGROUND OF RELATED ART

The last decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and files. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to a virtually infinite number of Web documents. In addition, Hypertext Markup Language (HTML), which had been the documentation language of the Internet or Web for years offered direct links between pages and other documentation on the Web and a variety of related data sources which were at first text and then images, and now include media, i.e. "hypermedia". This even further exploded the use of the Web. It was now possible for the Web browser or wanderer to literally spend hours going through document after document and accompanying media events in often less than productive excursions through the Web. These excursions often strained the users' time and resources.

A significant source of this drain is in the Web page, the basic document page of the Web. The handling and downloading of Web documents can be very time consuming. In the case of Web pages, we do not have the situation of a relatively small group of professional designers working out the human factors; rather, in the era of the Web, anyone and everyone can design a Web page. As a result, pages are frequently designed by developers without imaging or graphic skills or, worse yet, they may include media such as video or audio. The value of images and media to a particular user is often far outweighed by their long download time. In addition, there appears to be an increasing amount of advertising on the Web wherein the seeker of information at times has to be subject to "commercials" often in time and resource taxing image formats.

Developers of Web access and browsing systems have been addressing these problems and offering to users options to reduce download times. Some current Web browser systems do permit the user to set his overall operation to download all received Web pages in either the full HTML document mode or in a text only mode. However, the user must preselect the mode for the whole operation. Copending application Ser. No. 08/974,411, C. R. Nielsen et al., filed Nov. 19, 1997, provides the interactive user with the option of preliminary deletion of user selected files, such as image or animation files, from downloaded received Web pages. Other presently available implementations for downloading Web documents do offer the user the option of operating in a normal mode where both text and images are downloaded, or in an overall text-only mode where all received Web documents are downloaded in a text-only mode. In addition the above-referenced, copending application, DYNAMICALLY OPTIMIZING THE DOWNLOADING OF WORLD WIDE WEB HYPERTEXT DOCUMENTS AT RECEIVING DISPLAY STATIONS, G. McBrearty et al. Ser. No. 09/627,225 discloses optimizing downloading time by automatically switching the Web document downloading into a text-only mode when the downloading time exceeds a predetermined time.

SUMMARY OF THE PRESENT INVENTION

The present invention is a further implementation for reducing overall downloading time for Web documents without depriving the user of valuable Web document resources. The user at a receiving Web station is enabled to preselect which received Web documents will be downloaded in a text-only mode. Means are provided at the receiving Web station for determining whether a received Web document has been preselected for downloading in a text-only mode and, in responsive to these determining means, there are means for downloading such received preselected Web documents in a text-only mode.

The user is enabled not only to designate specified documents to be downloaded in a text-only mode but the user may also preselect whole Web domains or specified Web sites within such domains from which received Web documents are to be downloaded in a text-only mode. The user's preselections of such Web documents, Web sites or whole Web domains are preferably stored at the user's Web station.

All of the user preselection, determination of whether a received Web document has been preselected and the resultant downloading in a text-only mode could be carried out through a Web browser at the receiving Web station. In addition, since Web browsers provide for bookmarking direct links to provide the user with quick and easy access to desired Web documents, the means for enabling the user to also select text-only documents could readily be associated with the bookmarking function.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
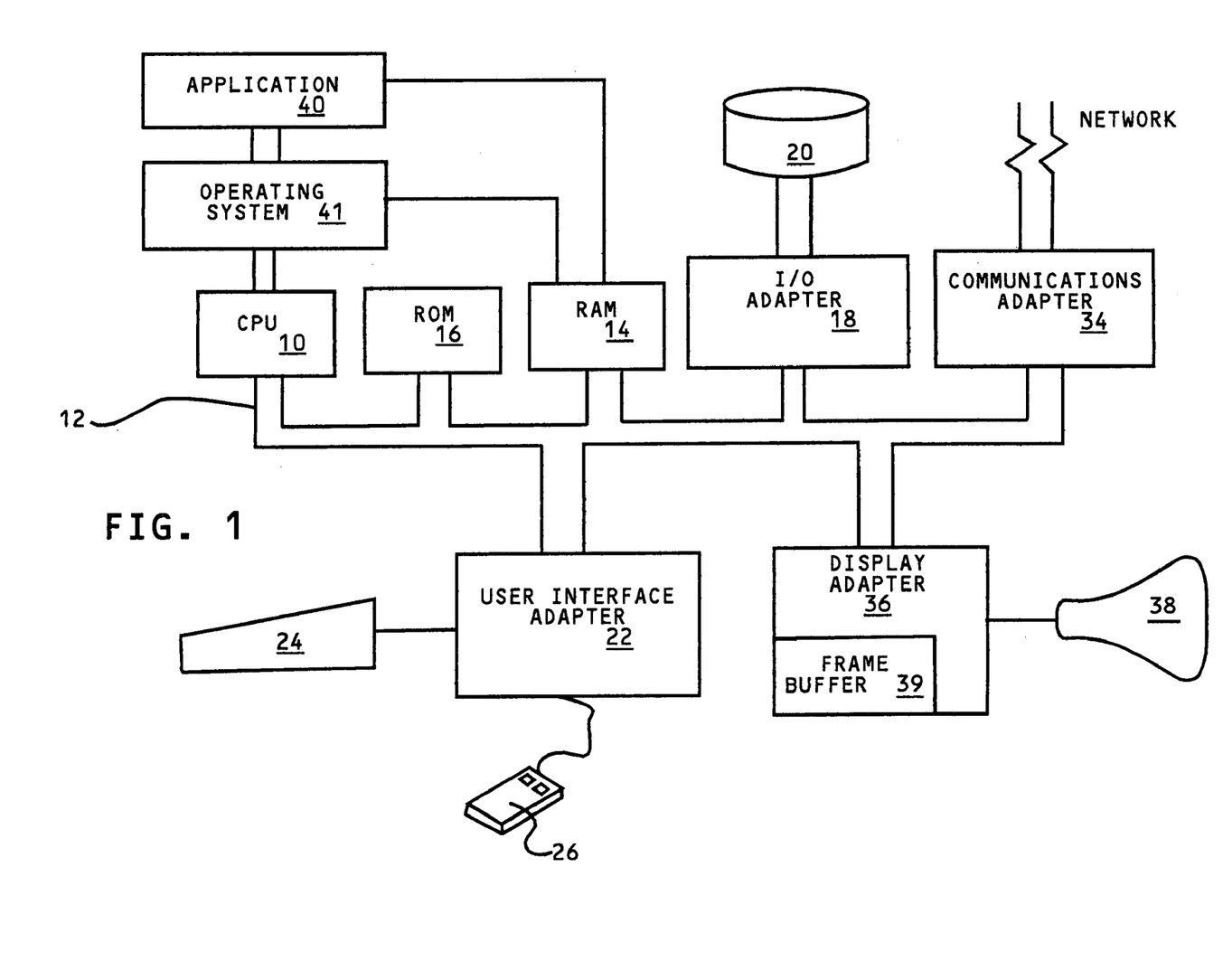
FIG. 1 is a block diagram of a data processing system including a central processing unit and network connections via a communications adapter which is capable of implementing a user interactive workstation on which the received data may be converted into displayed Web pages, and the pages monitored for preselection for a text-only mode.

Referring to FIG. 1, a typical data processing terminal is shown which may function as Web display stations used for receiving Web pages, for Web browsing and for preselecting Web documents and domains from which received documents are to be downloaded in a text-only mode.

A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows 98 or Windows NT™, as well as UNIX and AIX operating systems. Application programs 40, controlled by the system, are moved into and out of the main memory Random Access Memory (RAM) 14. These programs include the programs of the present invention for preselecting Web documents and domains from which received documents are to be downloaded in a text-only mode to be subsequently described in combination with any conventional Web browser, such as the Netscape Navigator 3.0™ or Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or a Wide Area Network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since the major aspect of the present invention is directed to Web pages transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999. Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers.

Web documents are conventionally implemented in HTML language, which is described in detail in the text entitled *Just Java*, van der Linden, 1997, SunSoft Press, particularly Chapter 7, pp. 249–268, dealing with the handling of Web pages; and also in the above-referenced *Mastering the Internet*, particularly pp. 637–642, on HTML in the formation of Web pages.

In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: The Complete Reference, Millennium Edition* text, Chapter 19, pp. 419–454, on the Netscape Navigator; Chapter 20, pp. 455–494, on the Microsoft Internet Explorer; and Chapter 21, pp. 495–512, covering Lynx, Opera and other browsers.

Figure 2:
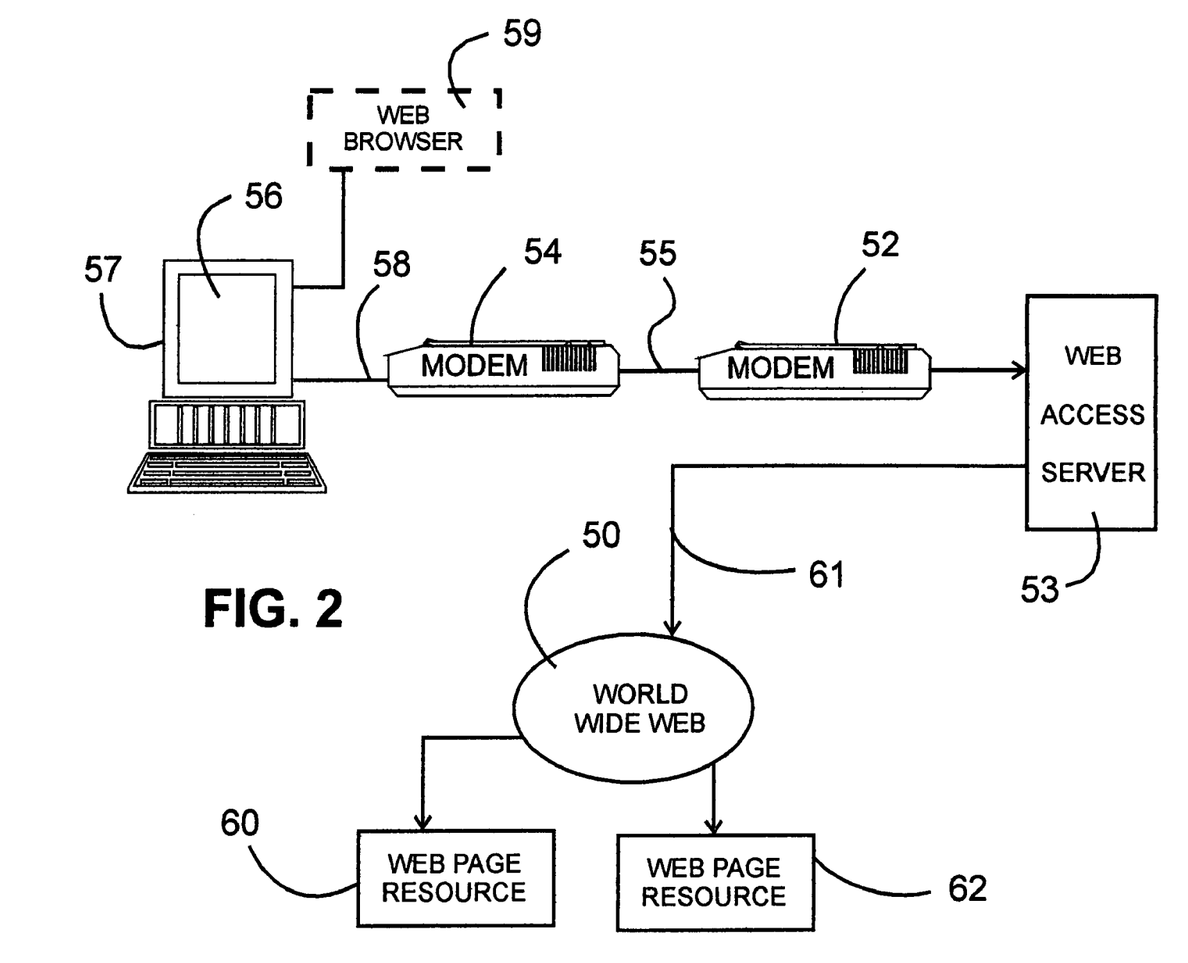
FIG. 2 is a generalized diagrammatic view of a Web portion upon which the present invention may be implemented.

A generalized diagram of a portion of the Web, which the computer controlled display terminal 57 used for Web page receiving during searching or browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56, which is one of a sequence of Web pages.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the receiving or requesting terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53, which may have accessed them from the Internet 50 via linkage 61. The Web browser program 59 operates within the display terminals 57 to control the communication with the Web access server 53 to thereby download and display the accessed Web pages 56 on terminal 57. The Web pages or documents are accessed through the Web from illustrative Web Page Resources 60 and 62 which represent the hierarchy of domains within the Web from which the Web documents may be transmitted. These will be discussed hereinafter in greater detail.

Figure 3:
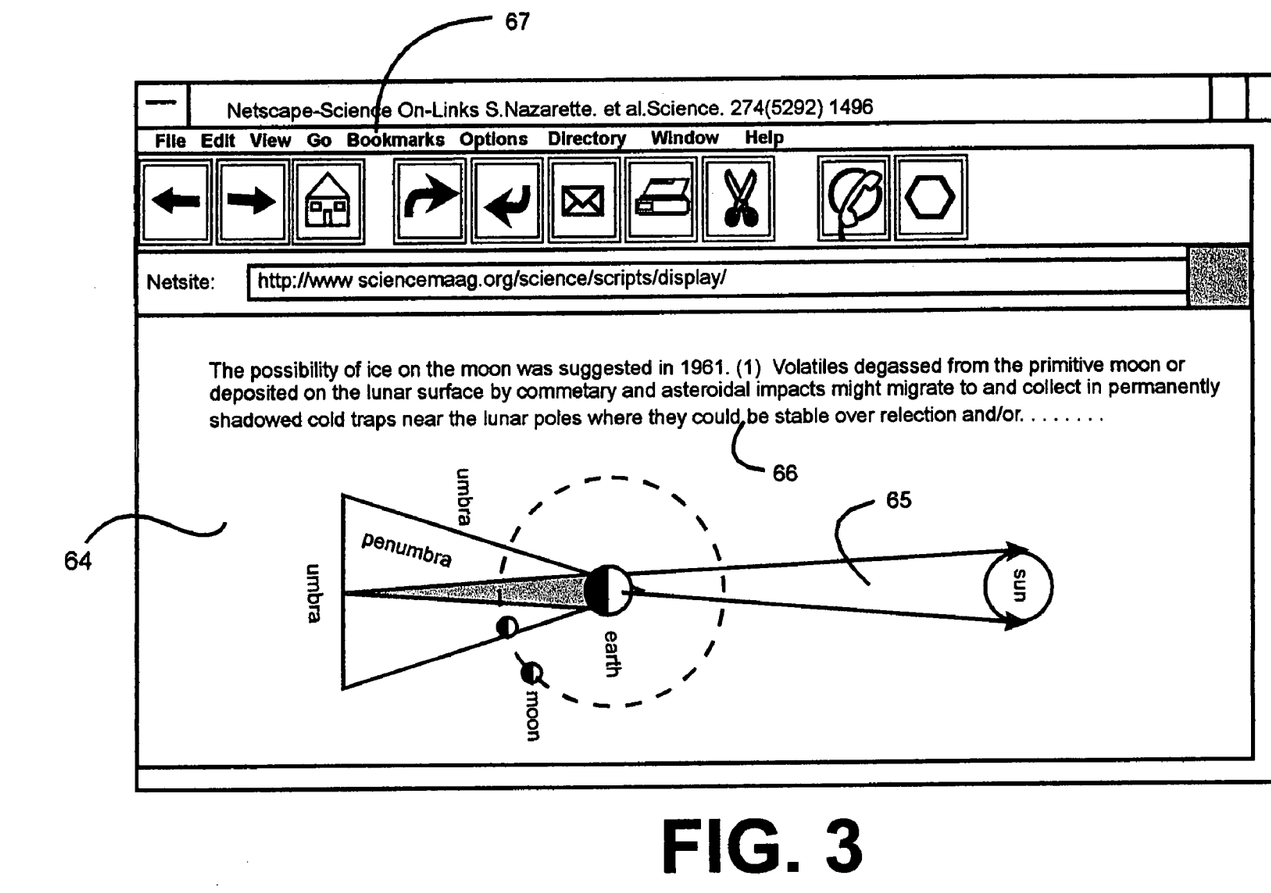
FIG. 3 is a diagrammatic view of a Web page displayed at a receiving display station in a Web browser window.
Figure 4:
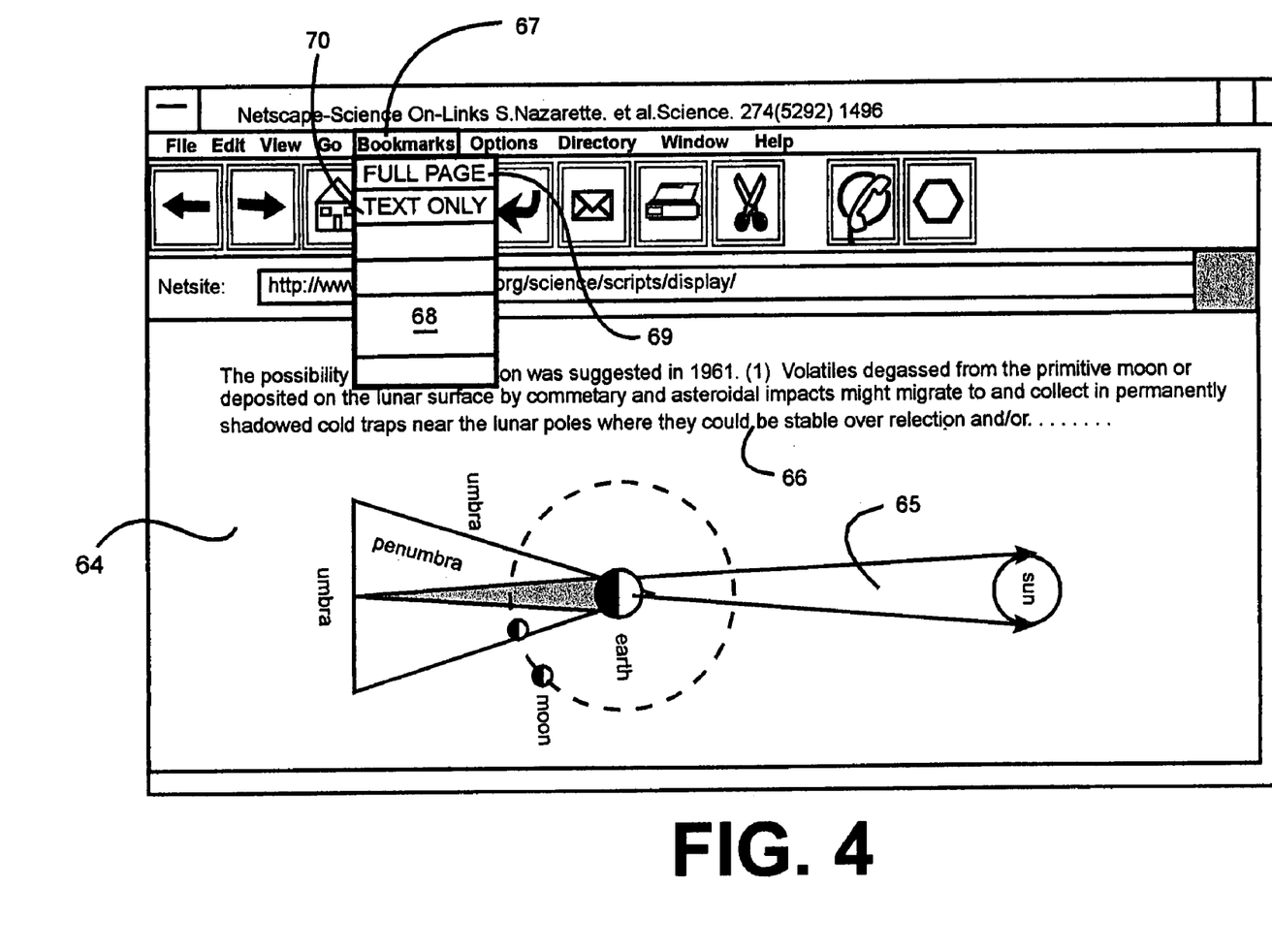
FIG. 4 is the diagrammatic view shown in FIG. 3 after the user has chosen to bookmark the Web page.

With this setup, the present invention, which will be subsequently described in greater detail with respect to FIGS. 3 through 6, may be carried out using Web browser 59. In FIG. 3, there is shown a typical illustrative Web page 64 which has text 66 and images 65. This is maintained within a conventional Web browser window. When the "Bookmarks" term 67 in the window title bar is selected, then, as shown in FIG. 4, a menu of bookmarking options 68 drops down. If the user selects "Full Page" item 69, then this Web page 64, which is being bookmarked for subsequent quick retrieval, will subsequently be retrieved and downloaded in the full HTML mode so that both text and image will be displayed. If the user selects "Text Only" item 70, then the Web page will subsequently be retrieved and downloaded in a text-only, e.g. ASCII, mode. The two download modes were made separate menu items only for convenience in illustration. In an actual operation, just Text-Only would be a menu item with Full Page being the default loading condition if Text-Only were not chosen.

Figure 5:
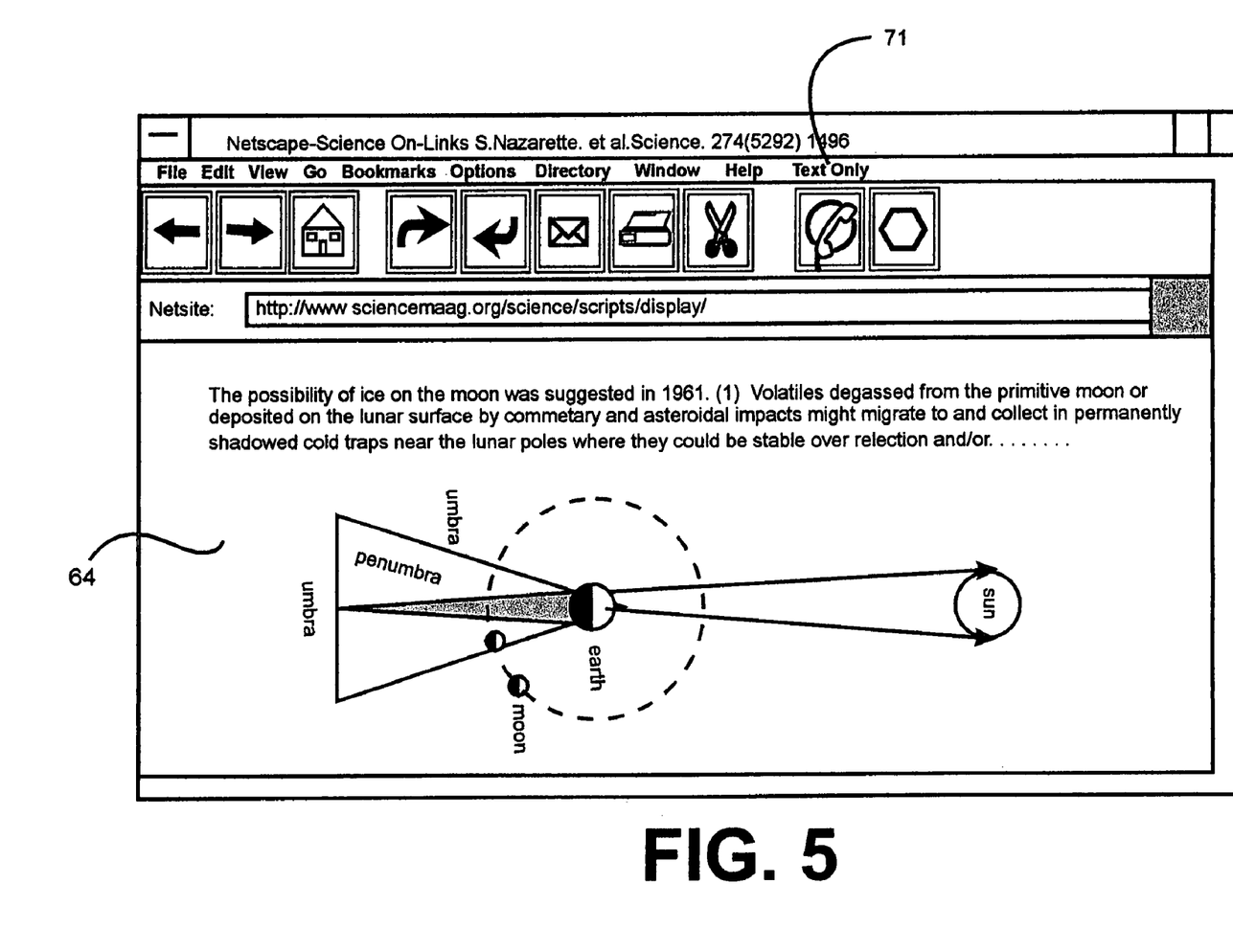
FIG. 5 is a diagrammatic view of a Web browser window including a Web page in the browser window giving the user the option of preselecting Web domains from which received documents are to be downloaded in a text-only mode.
Figure 6:
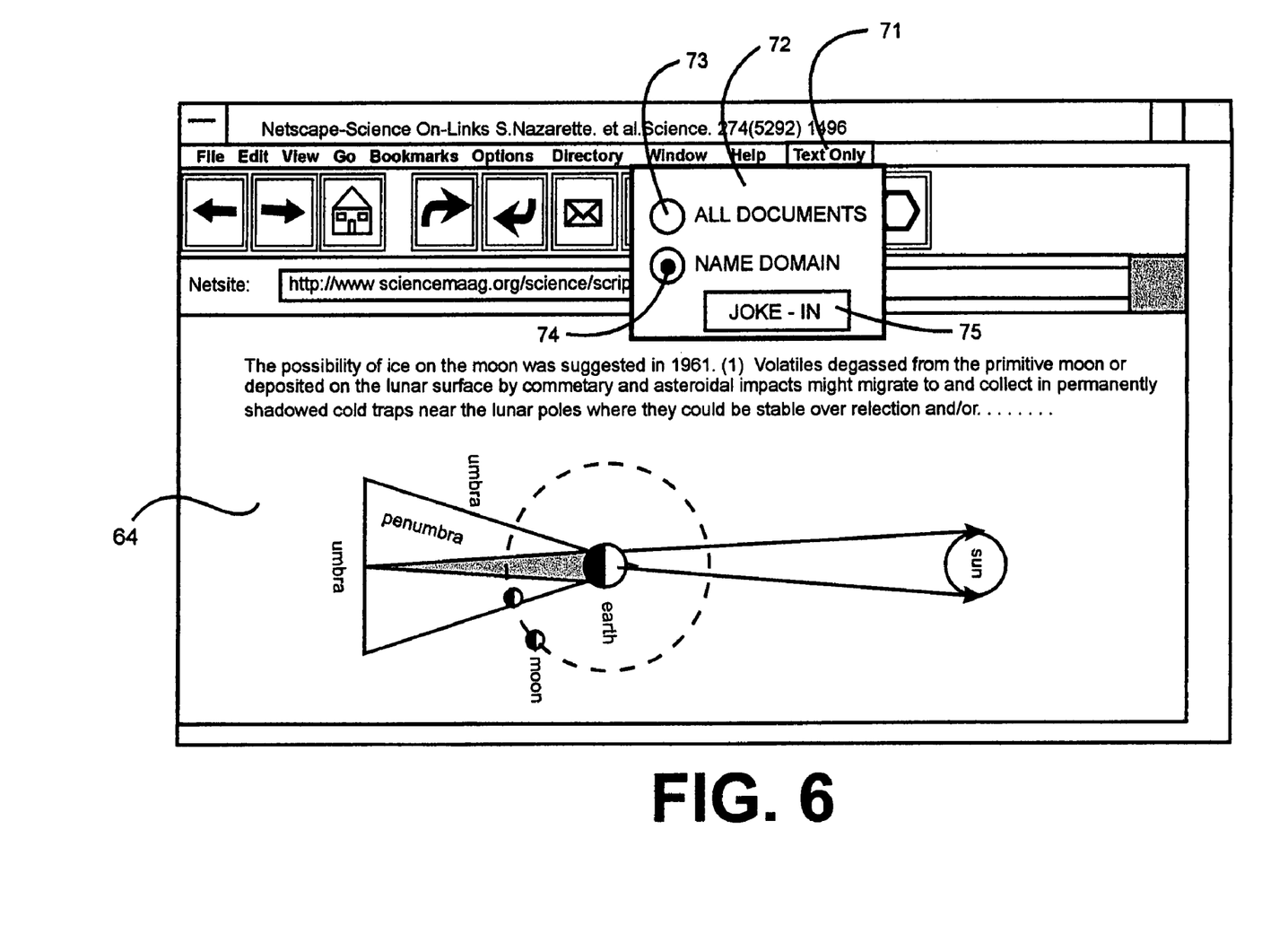
FIG. 6 is the diagrammatic Web page view of FIG. 5 after the user has activated a "text-only" button to thereby display a dialog box prompting the user for domain selection.

Of course, the preliminary designation of Web documents to be downloaded in a text-only mode when subsequently received may extend well beyond just bookmarked documents. FIGS. 5 and 6 show a simple illustrative example on how a user may easily conduct a dialog to select domains at various Web hierarchical levels from which received documents are to be downloaded in a text-only mode. At any point in a Web browsing session, a user may decide to make appropriate entries identifying Web domains from which received Web documents are to be downloaded in a text-only mode. The selection may not have anything to do with the Web page being currently displayed. For example, with respect to the Web browser window displaying Web page 64 in FIG. 5, a "Text-Only" button 71 may be provided in the window title bar which when selected provides dialog box 72 which offers the user the option of downloading all subsequently received Web documents in a text-only mode if "All Documents" item 73 is selected. If the user wishes to select a particular Web domain from which all subsequent documents will be downloaded in a text-only mode, then the user selects, as he does here, "Name Domain", item 74, and he may enter, in field 75, the name of the domain, which, in the present example is "Joke-In". The present invention enables the user to select a domain at any Web hierarchical level from the top level domains, e.g. "con, edu, gov, org, mil or net", down to individual domain names identifying particular computers or Web source stations and all levels including "Web Sites" therein between. By entering a domain name, the user sets up the browser system to have that domain name stored. Then, with respect to any subsequent incoming Web document, the browser will compare the TCP/IP Domain Name sequence of the document to the stored domains and, if a domain at any Web level compares, the document will be downloaded in a text-only mode. For background information on Web domains and the TCP/IP Domain Name System, reference may be made to the text, *The Web Navigator*, Paul Gilster, published by John Wiley & Sons, Inc., New York, 1997.

Figure 7:
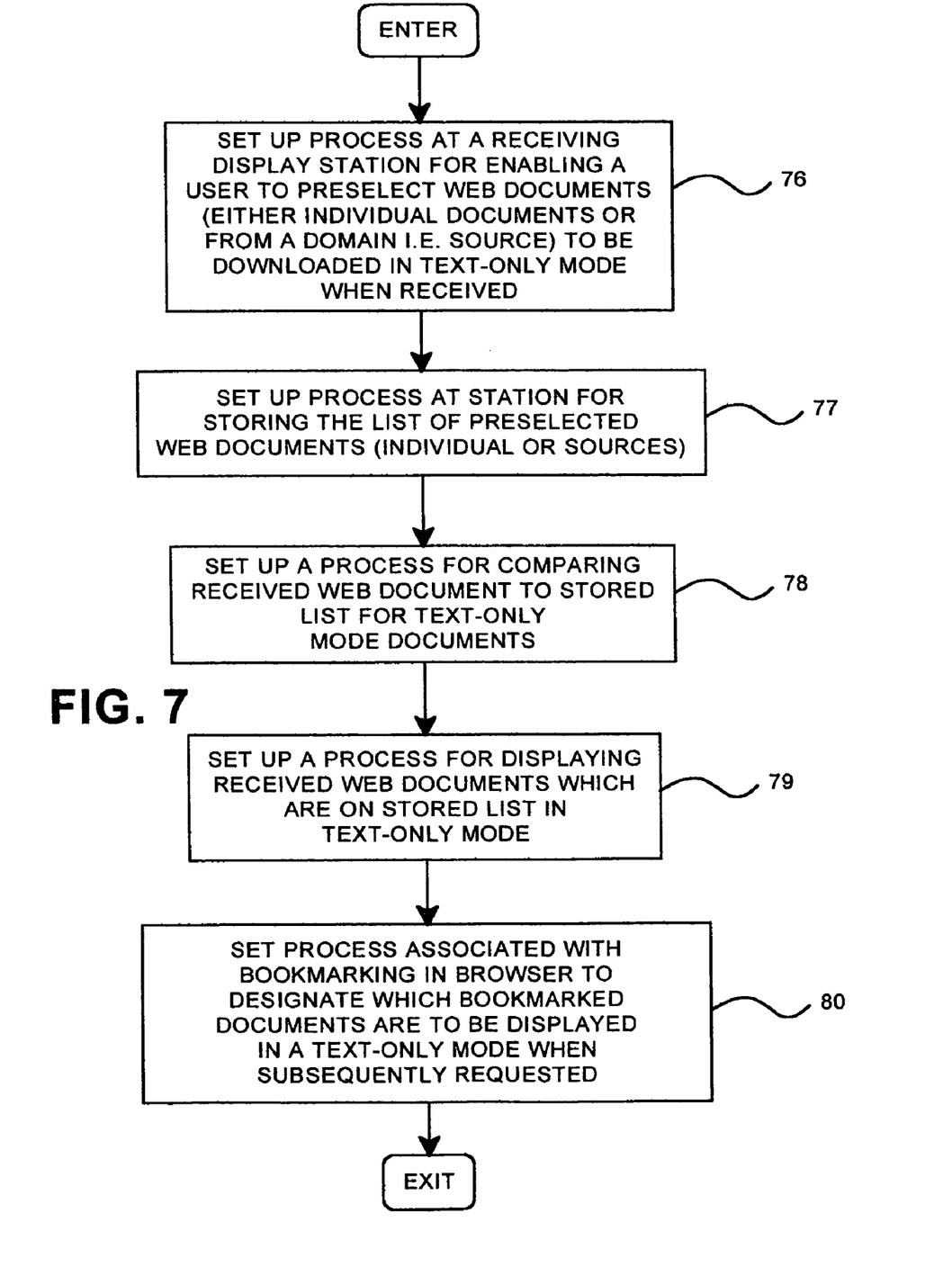
FIG. 7 is an illustrative flowchart describing the setting up of the process of the present invention for preselecting Web documents and preselecting Web domains from which documents are to be downloaded in a text-only mode.

FIG. 7 is a flowchart showing the development of a process according to the present invention for predesignating Web document domains from which subsequently received Web documents are to be downloaded in a text-only mode and for doing the same with respect to bookmarked documents. There is set up a process at a receiving display station for enabling a user to preselect Web documents (based upon the document source domain) which, when subsequently received, will be received in a text-only mode, step 76. A process is set up at the receiving station for storing a listing of such preselected documents or document domains, step 77. A process is set up for comparing received Web documents to the stored list, step 78. A process is set up for downloading and displaying received Web documents in a text-only mode if there is a comparison to a stored document or domain designation, step 79. In addition, there is set up in association with the bookmarking process in the Web browser, a process to designate which of the bookmarked documents are to be downloaded and displayed in a text-only mode when subsequently recalled, step 80.

Figure 8:
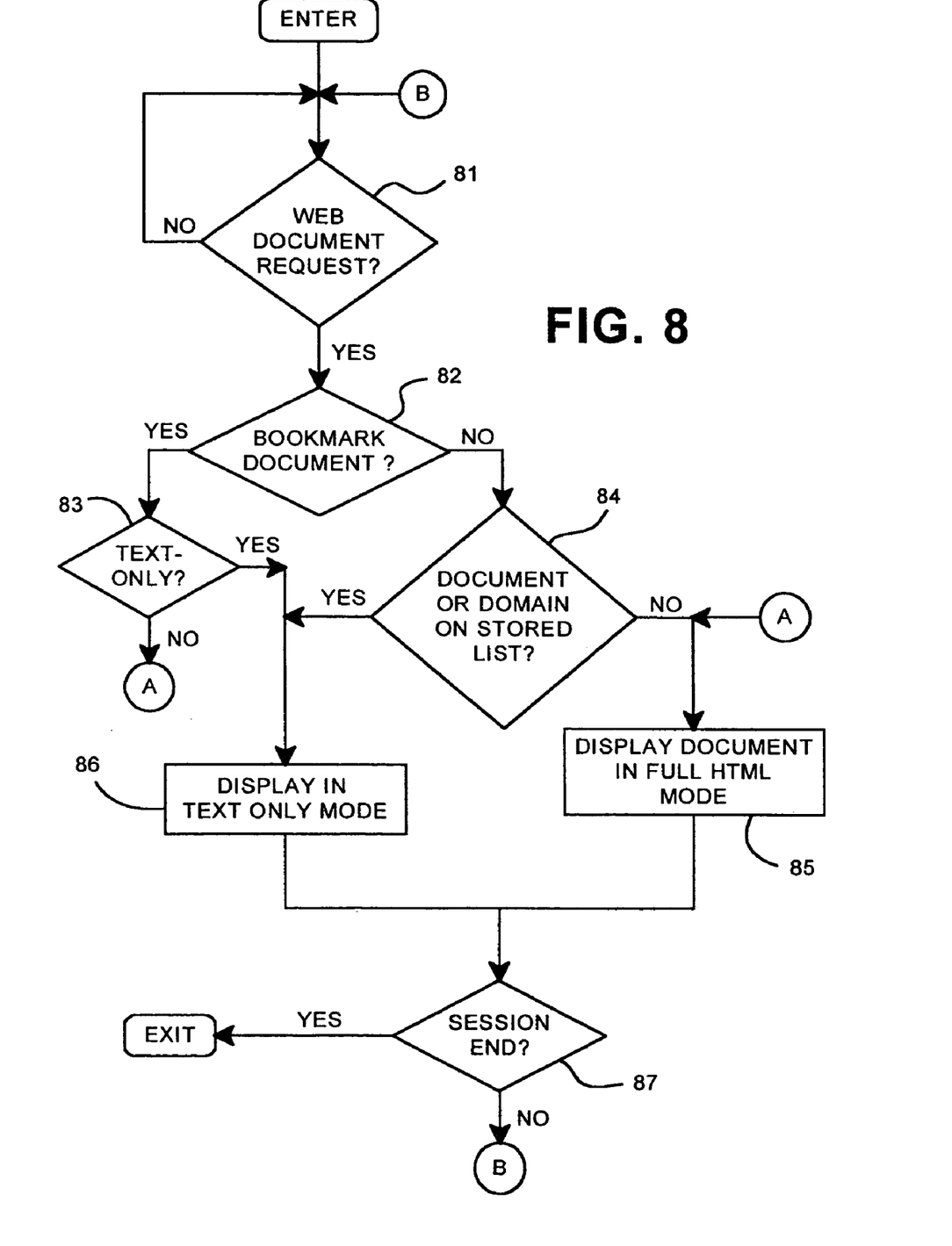
FIG. 8 is a flowchart of an illustrative run of the process setup in FIG. 7.

The running of the process set up in FIG. 7 will now be described with respect to the flowchart of FIG. 8. The flowchart represents some steps in a routine which will illustrate the operation of the invention in determining which subsequently received Web documents will be downloaded and displayed in a text-only mode. An initial determination is made as to whether a Web document has been requested, step 81. If No, the process is looped back to step 81 and a document request is awaited. If Yes, a document has been requested, then a further determination is made, step 82, as to whether the document is an already bookmarked document. If Yes, then a further determination is made as to whether the document has been designated as text-only, step 83. If No, then via branch "A", the process proceeds to step 85 where the document is displayed in its full HTML text. If Yes, the bookmarked document has been designated as text-only, then, step 86, the document is downloaded and displayed in text-only mode.

Returning now to decision step 82, if No, the document is not bookmarked, then, step 84, a determination is made as to whether the document domain is on the stored list. If No, the process proceeds to step 85 where the document is displayed in its full HTML text. If Yes, then, step 86, the document is downloaded and displayed in text-only mode. After either step 86 or 85, a determination may be made, step 87, as to whether the session is at an end. If Yes, the session is exited. If No, then the process returns via branch "B" to step 81 where the next Web document request is awaited.

Figure 9:
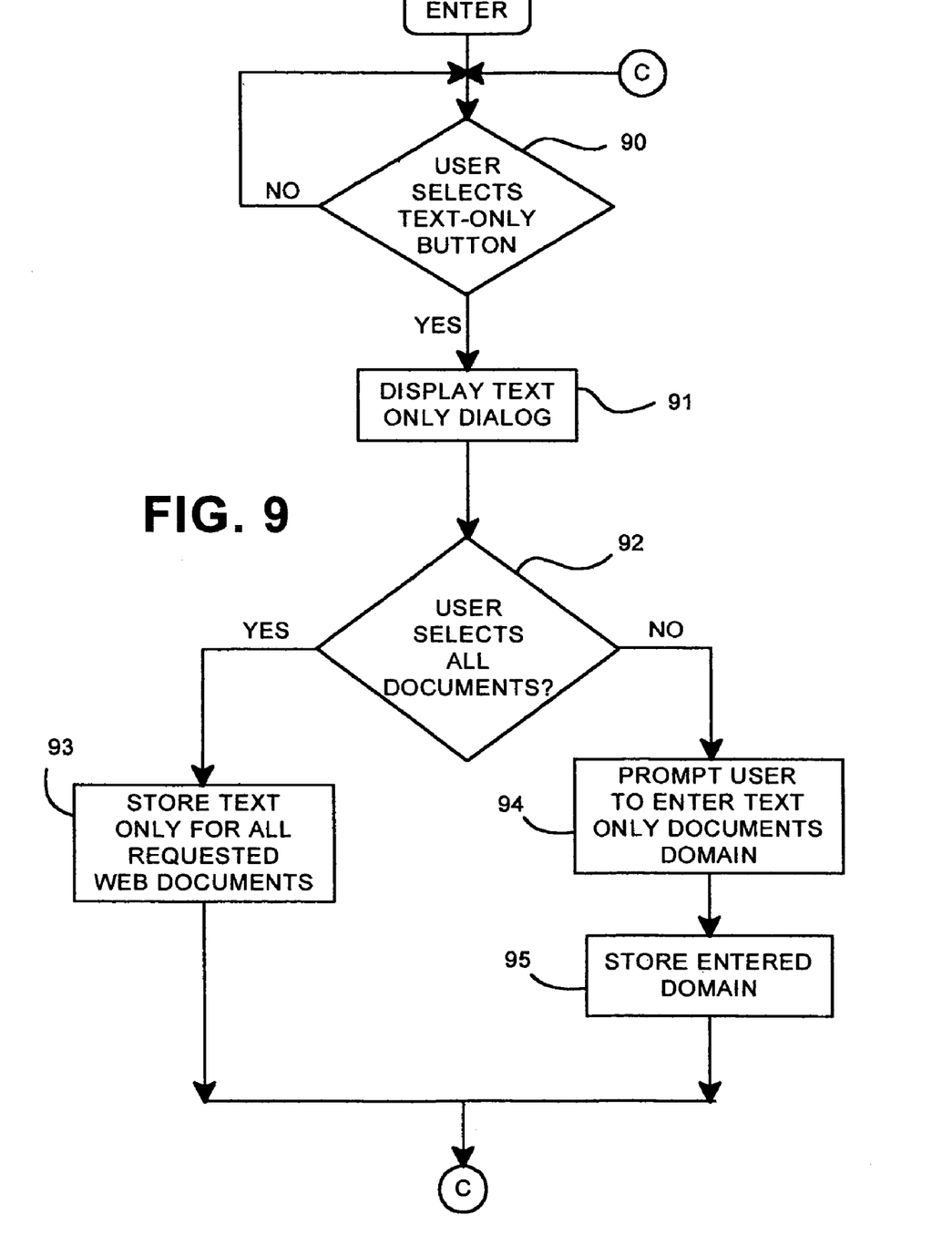
FIG. 9 is a flowchart of a process according to the present invention for an interactive user dialog for the selection of Web domains from which received documents are to be downloaded in a text-only mode.

FIG. 9 is a flowchart of the process whereby the user may select domains from which received Web documents will be downloaded in a text-only mode. An initial determination is made, step 90, as to whether the user has selected the text-only button 71, FIG. 6. If No, the process is looped back to step 90 and a selection is awaited. If Yes, the text-only button is selected, step 90, then the text-only dialog box 72 is displayed, step 91. Next, a determination is made, step 92, as to whether the user has selected the "All Documents" button 73. If Yes, there is stored data which will cause all received documents to be downloaded and displayed in text-only mode, step 93. If the user does not select "All Documents" from dialog box 72 but wishes to name a domain for text-only documents, the user is prompted to enter the preselected domain, step 94, and that domain is stored, step 95, as described above. After either step 93 or step 95 the process is branched back via branch "C" to step 90 where a user selection of the text only button is awaited.

One of the preferred implementations of the present invention is in application program 40, i.e. a browser program made up of programming steps or instructions resident in RAM 14, FIG. 1, of a Web receiving station during various Web operations. Until required by the computer system, the program instructions may be stored in another readable medium, e.g. in disk drive 20 or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web communication network with user access via a plurality of data processor controlled interactive receiving display stations for displaying requested hypertext Web documents of at least one display page containing text and images, a system for reducing the downloading time of predetermined hypertext Web documents requested from said Web comprising:
    means at a receiving display station for downloading said requested hypertext Web document in a hypertext mode,
    means enabling a user at said receiving display station to preselect said requested hypertext Web documents to be downloaded in a text-only mode,
    means for determining whether a requested hypertex web page document has been preselected for downloading in a text-only mode, and means responsive to said determining means for downloading said requested preselected hypertext Web document in a text-only mode.

2. The network system of claim 1 further including means for bookmarking selected requested hypertext Web documents to thereby store at said receiving display station, direct links to the documents for future access, said bookmarking means including said means enabling the user to preselect said text-only mode to thereby enable the user to preselect whether the bookmarked hypertext Web document will be downloaded in a text-only mode when received.

3. The network system of claim 1 wherein said user is enabled to preselect domains from which, all requested hypertext Web documents will be downloaded in a text-only mode.

4. The network system of claim 3 wherein said user is enabled to preselect Web sites from which, all requested hypertext Web documents will be downloaded in a text-only mode.

5. The network system of claim 3 further comprising:
    World Wide Web browsing means at said receiving display station including:
        said means enabling a user at said receiving display station to preselect domains front which, all requested hypertext Web documents will be downloaded in a text-only mode, and
        said means for determining whether a requested hypertext web document has been preselected for downloading in a text-only mode.

6. The network system of claim further comprising:
    World Wide Web browsing means at said receiving display station including:
        said means for bookmarking, and
        said means for determining whether a requested hypertext web document has been preselected for downloading in a text-only mode.

7. The network system of claim 1 further including means at said receiving display station for storing said user preselections of hypertext Web documents to be downloaded in a text-only mode.

8. In a World Wide Web communication network with user access via a plurality of data processor controlled interactive receiving display stations for displaying requested hypertext Web page documents of at least one display page containing text and images, a method for reducing the downloading time of a predetermined hypertext Web documents requested from said Web comprising:
    normally downloading said requested hypertext Web document at a receiving display station in a hypertext mode,
    enabling a user at said receiving display station to preselect said requested hypertext Web documents to be downloaded in a text-only mode,
    determining whether a requested hypertext Web page document has been preselected for downloading in a text-only mode, and
    downloading such requested preselected hypertext Web document in a text-only mode in responsive to said determination.

9. The method of claim 8 further including the step of:
    bookmarking selected requested hypertext Web documents to thereby store at said receiving display station, direct links to the documents for future access,
    said bookmarking step, being carried out in association with said step of enabling the user to preselect said text-only mode to thereby enable the user to preselect whether the bookmarked hypertext Web document will be downloaded in a text-only mode when requested.

10. The method of claim 8 wherein said user is enabled to preselect domains from which, all requested hypertext Web documents will be downloaded in a text-only mode.

11. The method of claim 10 wherein said user is enabled to preselect Web sites from which, all requested hypertext Web documents will be downloaded in a text-only mode.

12. The method of claim 10 further comprising:
    World Wide Web browsing means at said receiving, display station including:

a Web browsing process at said receiving display station including:

said steps of:

enabling a user at said receiving display station to preselect domains from which, all requested hypertext Web documents will be downloaded in a text-only mode, and determining whether a requested hypertext web document has been preselected for downloading in a text-only mode.

13. The method of claim 9 further comprising:

a Web browsing process at said receiving display station including:

said steps of:

bookmarking received Web documents, and determining whether an accessed Web document has been preselected for downloading in a text-only mode.

14. The method of claim 8 further including the step of storing said user preselections of Web documents to be downloaded in a text-only mode at said receiving display station.

15. A computer program having code recorded on a computer, readable medium for reducing the downloading time of predetermined hypertext documents of at least one display page containing text and images accessed at a World Wide Web display station comprising:

means at a receiving display station for downloading an accessed hypertext Web document in a hypertext mode, means enabling a user at said receiving display station to preselect received said accessed Web documents to be downloaded in a text-only mode, means for determining whether an accessed web page document has been preselected for downloading in a text-only mode, and means responsive to said determining means for downloading said accessed preselected web document in a text-only mode.

16. The computer program of claim 15 further including:

means for bookmarking selected received Web documents to thereby store at said receiving display station, direct links to the documents for future access, said bookmarking means including said means enabling the user to preselect said text-only mode to thereby enable the user to preselect whether the bookmarked Web document will be downloaded in a text-only mode when accessed.

17. The computer program of claim 15 said user is enabled to preselect domains from which, all accessed Web documents will be downloaded in a text-only mode.

18. The computer program of claim 17 wherein said user is enabled to preselect Web sites from which, all accessed Web documents will be downloaded in a text-only mode.

19. The computer program of claim 17 further comprising:

World wide Web browsing means at said receiving display station including:

said means enabling a user at said receiving display station to preselect domains from which, all accessed Web documents will be downloaded in a text-only mode, and said means for determining whether a accessed web document has been preselected for downloading in a text-only mode.

20. The computer program of claim 16 further comprising:

World wide Web browsing means at said receiving display station including:

said means for bookmarking, and said means for determining whether an accessed web document has been preselected for do loading in a text-only mode.

21. The computer program of claim 15 further including means at said receiving display station for storing said user preselections of Web documents to be downloaded in a text-only mode.

22. The network system of claim 1 wherein said text-only mode is an ASCII mode.

23. The method of claim 8 wherein said text-only mode is an ASCII mode.

24. The computer program of claim 15 wherein said test-only mode is an ASCII mode.

* * * * *

UNITED STATES PATENT AND TRADEMARK OFFICE
CERTIFICATE OF CORRECTION

| | | |
|---|---|---|
| PATENT NO. | : 7,085,816 B1 | Page 1 of 1 |
| APPLICATION NO. | : 09/627223 | |
| DATED | : August 1, 2006 | |
| INVENTOR(S) | : Gerald Francis McBrearty, Shawn Patrick Mullen and Johnny Meng-Han Shieh | |

It is certified that error appears in the above-identified patent and that said Letters Patent is hereby corrected as shown below:

Column 8, Line 13, delete "front" and insert --from--,
          Line 19, insert --2--after the word "claim".
          Line 66, delete ",".
Column 10, Line 14, delete "wide" and insert --Wide--,
           Line 26, delete "wide" and insert --Wide--,
           Line 30, delete "do loading" and insert --downloading--,
           Line 42, delete "test" and insert --text--.

Signed and Sealed this

Second Day of January, 2007

JON W. DUDAS
*Director of the United States Patent and Trademark Office*